No. 612,759.  
E. H. WARTMAN.  
FRUIT GRADER.  
(Application filed Oct. 11, 1897.)  
Patented Oct. 18, 1898.

(No Model.)

Witnesses  
O. Seiffert  
Rose Smith

Inventor  
Edward H. Wartman  
per R. B. Chamberlin,  
Attorney

UNITED STATES PATENT OFFICE.

EDWARD H. WARTMAN, OF KINGSTON, CANADA.

FRUIT-GRADER.

SPECIFICATION forming part of Letters Patent No. 612,759, dated October 18, 1898.

Application filed October 11, 1897. Serial No. 654,768. (No model.) Patented in Canada March 12, 1897, No. 55,238.

*To all whom it may concern:*

Be it known that I, EDWARD H. WARTMAN, a citizen of Canada, residing at Kingston, in the Province of Ontario, Canada, have invented certain new and useful Improvements in Fruit-Graders, (for which I have obtained Letters Patent in Canada, No. 55,238, dated March 12, 1897;) and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
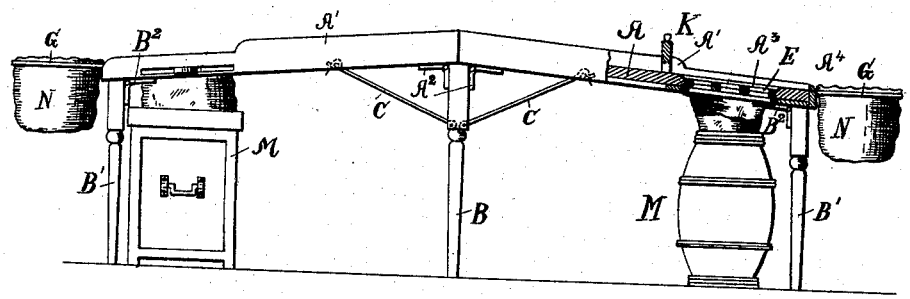
Figure 2:
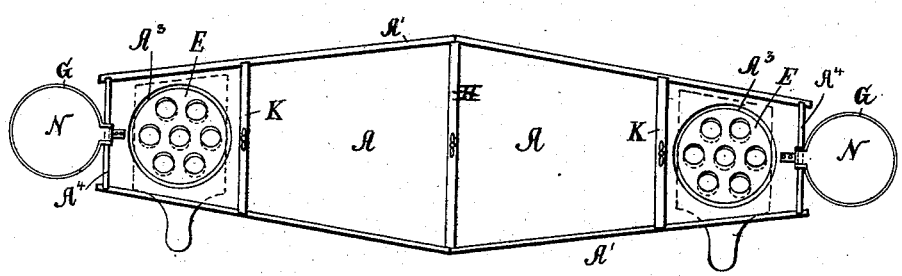

Figure 1 is a side elevation of my grader as in use, a portion broken away to clearly show the grading-aperture and feed-slide; and Fig. 2 is a top view or plan of the same.

My invention has for its object to sort or grade apples and other fruit to a uniform size, so that fruit of one size may be placed in each barrel or package.

My invention consists of a folding stand having an inclined platform or floor and apertures near the bottom fitted with interchangeable perforated grading-plates and adjustable feed partitions or slides to regulate the flow to the grading-plates, and a holder for a basket or other receptacle to receive the graded fruit. The platform or floor is made to incline in opposite directions, so that grading of two sizes or two kinds of fruit may be carried on simultaneously.

A is the floor or platform on which the fruit to be graded is placed, and said platform to double the capacity of the machine inclines in opposite directions, and provided with a raised side A', and attached together at the meeting ends by hinges $A^2$ to the legs B and at the opposite ends to the legs B' by hinges $B^2$, so that the grader may be folded for convenience of storage when not in use.

C are stay-hooks connecting the legs B and the platform A to hold the grader erect when in use.

The divided platform tapers toward the lower end, and the lower ends have an aperture $A^3$, which is beveled around the upper edge to prevent injury to the fruit and be below the plane of the platform-surface, and said apertures are made to hold and receive interchangeably a removable perforated grating or grading-plate E, perforated to a size smaller than the desired grade of the fruit, so that the fruit smaller than the grade will fall into a receptacle M under the grading-aperture in the platform, and the overflow or graded fruit will pass into a basket N or other receptacle at the lower ends of the platform or floor, and said receptacle is preferably supported by a holder G, hinged to the foot of the floor to fold therewith compactly and be convenient and ready for use. The floors or platforms have a removable transverse partition H at the meeting edges to separate two kinds of fruit when both are being graded at one time to prevent intermixture and near the grading-apertures are provided with a removable and adjustable feed-slide K to prevent the fruit crowding the apertures by raising and lowering the slide vertically by hand to allow the fruit to pass under in the proper quantity.

Instead of having a number of plates which are made interchangeable a single plate for each end of the frame may be used and the slide placed under the plate or grate, by means of which the sizes of the openings can be controlled to any desired degree. These slides extend across through the frame in any desired relation to the plates or grates, as shown. Extending from the under side of each of the grates or plates is a canvas tube or conveyer which conducts the fruit into the receptacle placed to receive it.

The lower ends of the platform or floor may be provided with a stop-bar $A^4$ to prevent the fruit rolling directly into the basket, preference being given to removal by hand and dropping the fruit gently into the basket to prevent injury.

When grading one size has been performed, the grading-plate is removed and another grading-plate used having smaller perforations.

I claim as my invention—

In a fruit-grader, the inclined platform or floor A, hinged supporting-legs B, B', braces for locking the legs in position, and the vertically-adjustable slides K placed in the vertical sides of the platform or floor for regulating the feed, combined with the perforated grading-plates E, placed in apertures near the lower outer ends of the platform, suitable guides extending from the under sides of the apertures, receptacle-holders arranged at the lower ends of the platforms, and slides or partitions placed under the grading-plates for the purpose of closing the apertures therein, substantially as shown.

In testimony whereof I affix my signature in presence of two witnesses.

EDWD. H. WARTMAN.

Witnesses:
 FRANCIS KING,
 ANNIE JONES TRACY.